(12) United States Patent
Kubo et al.

(10) Patent No.: US 7,206,502 B2
(45) Date of Patent: Apr. 17, 2007

(54) APPARATUS AND METHOD FOR RECORDING AND REPRODUCING DIGITAL DATA

(75) Inventors: Hiroaki Kubo, Ohmihachiman (JP); Masahiro Murakami, Kyoto-fu (JP); Katsuyuki Sugita, Kyoto (JP)

(73) Assignee: International Business Machines Corporation, Armonk, NY (US)

( * ) Notice: Subject to any disclaimer, the term of this patent is extended or adjusted under 35 U.S.C. 154(b) by 605 days.

(21) Appl. No.: 09/961,020

(22) Filed: Sep. 21, 2001

(65) Prior Publication Data

US 2002/0067916 A1   Jun. 6, 2002

(30) Foreign Application Priority Data

Sep. 21, 2000   (JP) ................. 920000259JP1

(51) Int. Cl.
*H04N 7/26*   (2006.01)

(52) U.S. Cl. ...................... 386/124; 386/109

(58) Field of Classification Search .............. 386/46, 386/82, 92, 109, 122, 124, 125, 126, 131, 386/68, 70, 129
See application file for complete search history.

(56) References Cited

U.S. PATENT DOCUMENTS

| | | | | |
|---|---|---|---|---|
| 3,668,308 A | * | 6/1972 | Burt et al. ................. 386/46 |
| 5,371,889 A | * | 12/1994 | Klein ......................... 718/106 |
| 5,384,831 A | * | 1/1995 | Creswell et al. ........ 379/114.05 |
| 5,388,074 A | * | 2/1995 | Buckenmaier .......... 365/189.05 |
| 5,502,601 A | * | 3/1996 | Scheffler ..................... 360/32 |
| 5,526,367 A | * | 6/1996 | Ono et al. .................. 714/748 |
| 6,018,612 A | * | 1/2000 | Thomason et al. ......... 386/125 |
| 6,240,244 B1 | * | 5/2001 | Ikeda ......................... 386/125 |
| 6,266,477 B1 | * | 7/2001 | Ichinoi ....................... 386/124 |
| 6,628,890 B1 | * | 9/2003 | Yamamoto et al. ......... 386/125 |
| 6,647,201 B2 | * | 11/2003 | Yoshimura et al. ........... 386/68 |
| 6,868,225 B1 | * | 3/2005 | Brown et al. ............... 386/125 |
| 6,879,768 B1 | * | 4/2005 | Ono et al. .................. 386/124 |

FOREIGN PATENT DOCUMENTS

| | | |
|---|---|---|
| JP | 08-256304 | 10/1996 |
| JP | 10-322662 | 12/1998 |
| JP | 11-351422 | 12/1999 |
| JP | WO 00/40019 | 7/2000 |
| JP | 2000-24543 | 8/2000 |
| JP | 2000-251402 | 9/2000 |
| JP | 2000-253359 | 9/2000 |
| JP | 2001076473 | 3/2001 |
| JP | 2001-11943 | 4/2001 |

* cited by examiner

*Primary Examiner*—James J. Groody
*Assistant Examiner*—James A. Fletcher
(74) *Attorney, Agent, or Firm*—Schmeiser, Olsen & Watts; William H. Steinberg (57) ABSTRACT

An apparatus for recording and reproducing digital data, which is capable of recording digital broadcast data while reproducing previously-recorded digital broadcast data is provided. An apparatus 10 for recording and reproducing digital data, which is capable of recording MPEG2-PES data 42 generated from record control means 16 in recording means 20 by controlling the record control means 16 and reproduction control means 22 by time division control means 18 while reading the MPEG2-PES data 42 recorded in the recording means 20 by reproduction control means 22.

13 Claims, 7 Drawing Sheets

APPARATUS AND METHOD FOR RECORDING AND REPRODUCING DIGITAL DATA

BACKGROUND OF THE INVENTION

The present invention relates to an apparatus and method for recording and reproducing digital data, and more particularly to an apparatus for recording and reproducing MPEG2 (Moving Picture Experts Group Phase 2) data and a method for recording and reproducing data.

DESCRIPTION OF RELATED ART

Figure 6:
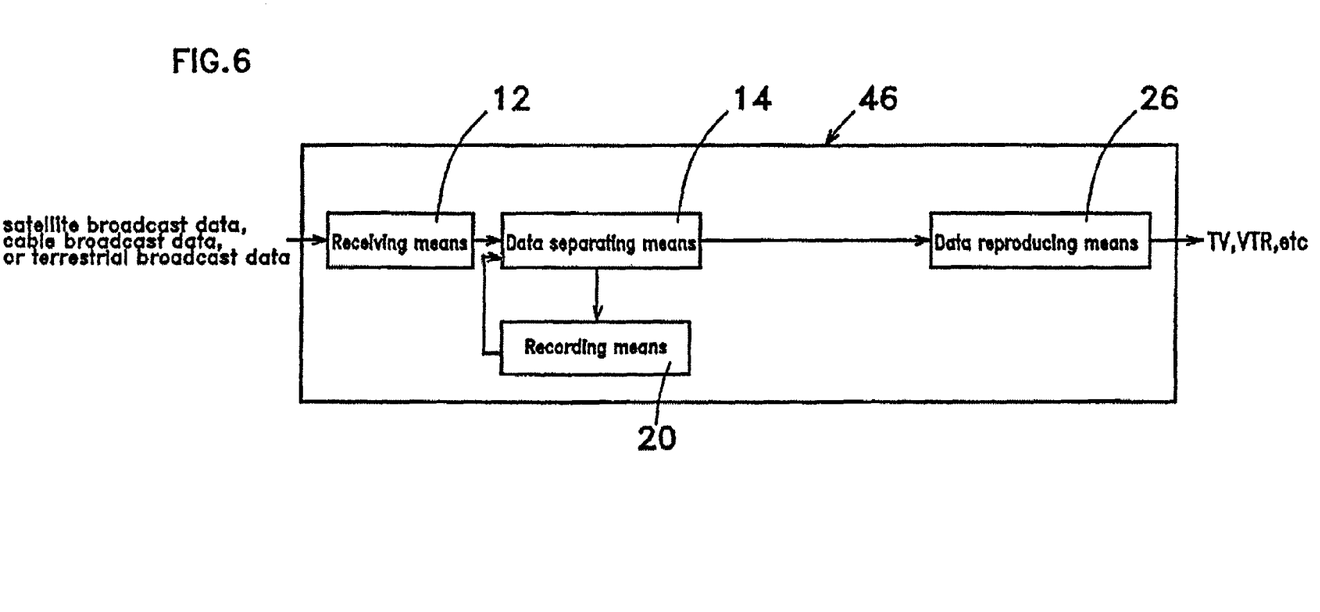
FIG. 6 is a block diagram of a conventional apparatus for recording and reproducing digital data.
Figure 7:
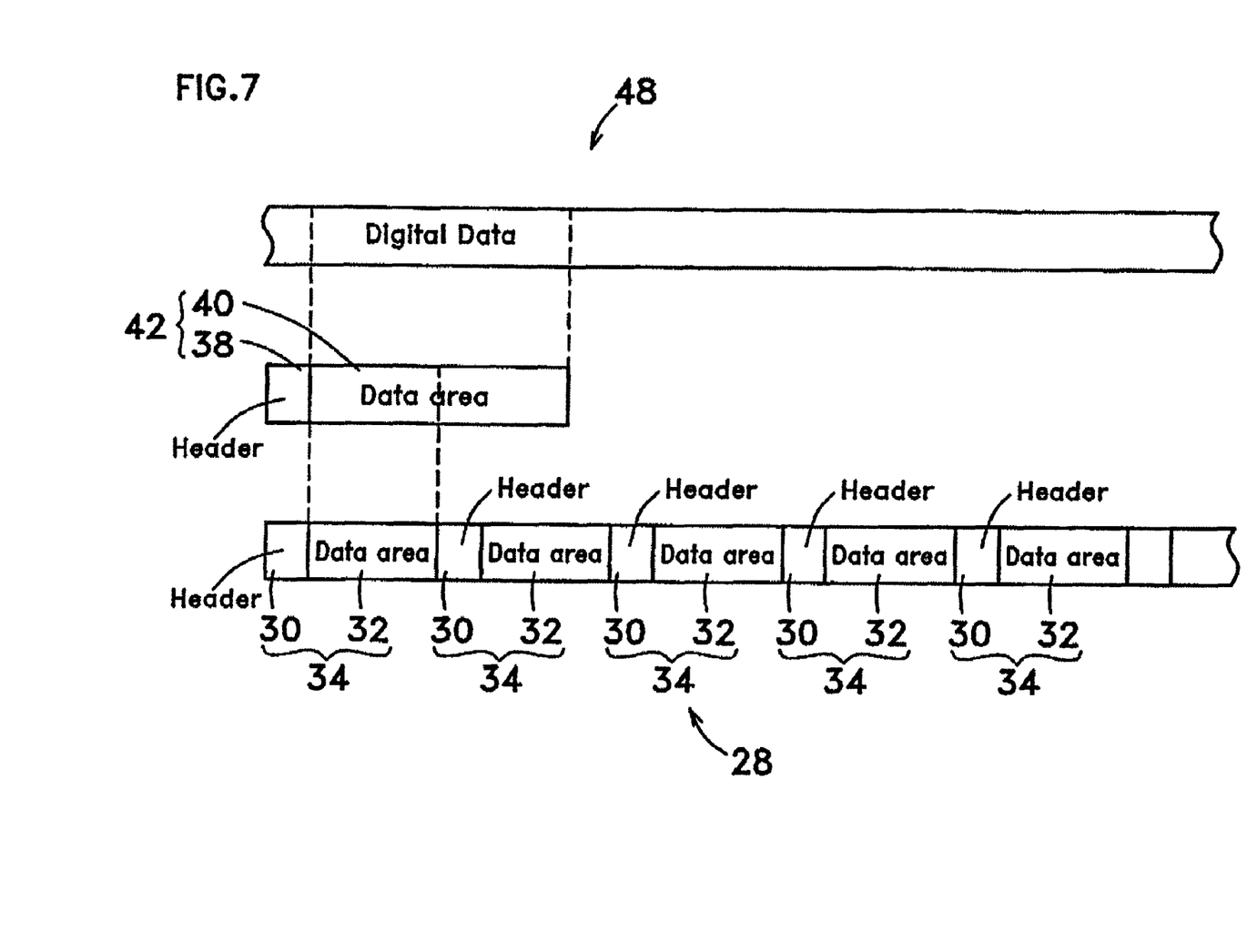
FIG. 7 shows the relationship between various data formats.

As the digitalization of broadcasting has surged forward, a first-generation digital set-top box has become wide spread as a digital broadcast receiver. However, it is expected that a next-generation digital set-top box 46 shown in FIG. 6, which comprises recording means 20 and has functions of recording and reproducing digital broadcast data, will be commercially available in near future. When digital broadcast data is recorded, receiving means 12 receives digital broadcast data and selects a channel. Data of the selected channel, or MPEG2-TS data 28, is composed of a plurality of TS (transport stream) packets 34, as shown in FIG. 7. The data 28 is composed of a plurality of programs multiplexed in a time-division manner. Data separating means 14 extracts specific TS packets 34 corresponding to a desired program from the MPEG2-TS data 28. The extracted packets 34 are defined as partial TS data. The partial TS data is recorded in recording means 20. The TS packet 34 has a length of 188 bytes, and consists of a header 30 and a data area 32 comprising compressed audio/video data. When the recorded digital data is reproduced, the partial TS data recorded in the recording means 20 of FIG. 6 is transmitted to data separating means 14. The data separating means 14 extracts MPEG2-PES (Packetized Elementary Stream) data 42 or MPEG2-ES (Elementary Stream) data 48 from the partial TS data, and sends the MPEG-2PES or MPEG2-ES to data reproducing means 26. In the MPEG2-ES data 48, all the compressed audio/video data constitutes one stream of data. The smallest unit of data in the MPEG2-ES data 48, which is the equivalent of one frame of data, for example, is MPEG2-PES data 42. The data area 40 is composed of at least one data area 32 of the TS packet 34. The compressed audio/video data is decoded in the reproducing means 26, and displayed on a television screen.

In the aforementioned apparatus of FIG. 6, however, the data separating means 14 must be used for recording and reproducing digital broadcast data, and the means 14 must receive data selectively from the receiving means 12 or the recording means 20. For this reason, the recording means 20 cannot record and reproduce digital broadcast data at the same time.

In order to solve the above problem, a plurality of data separating means 14 may be used. However, since the cost of data separating means 14 forms a large proportion of the price of the digital set-top box 46, the use of a plurality of data separating means 14 causes an increase in the price of the set-top box 46.

Japanese Unexamined Patent Publication No. 9-322148 discloses an apparatus for recording and reproducing a plurality of digital data. However, no mention was made of whether the apparatus is capable of recording digital broadcast data while reproducing previously-recorded digital broadcast data. Since the apparatus comprises a separating part for recording and reproducing digital broadcasting data, it is obvious that the apparatus is not capable of recording digital broadcast data while reproducing previously-recorded digital broadcast data.

In addition, Japanese Unexamined Patent Publication No. 11-205748 discloses an apparatus for recording and reproducing digital data using a tape as a record medium. Since the record medium is tape, a record head and a reproduction head cannot be used at the same time. Therefore, the apparatus is not capable of recording digital broadcast data while reproducing previously-recorded digital broadcast data.

An object of the present invention is to provide an apparatus for recording and reproducing digital data, which is capable of recording digital broadcast data while reproducing previously-recorded digital broadcast data.

SUMMARY OF THE INVENTION

An apparatus for recording and reproducing digital data according to the present invention, comprises:

receiving means for receiving first compressed data composed of a plurality of packets, in which a plurality of programs are multiplexed in a time division manner;

data separating means for extracting specific compressed audio/video data corresponding to a desired program from the first compressed data received by the receiving means;

record control means for generating second compressed data including the compressed audio/video data extracted by the data separating means;

recording means for recording the second compressed data generated by the record control means;

data reproducing means for decoding the compressed audio/video data included in the second compressed data; and time division control means for controlling the recording and reading of the second compressed data in and from the recording means in a time division manner.

In the aforementioned apparatus for recording and reproducing digital data according to the present invention, the recording means receives the first compressed data, and the data separating means extracts the compressed audio/video data. The record control means generates the second compressed data including the extracted audio/video data, and the recording means records the generated second compressed data. The data reproducing means decodes and reproduces the second compressed data. The time division control means controls the recording and reading of the second compressed data in a time division manner, whereby it appears to the viewer that the recording and reading of data are carried out at the same time in the apparatus.

A method for recording and reproducing digital data according to the present invention, comprises the steps of:

receiving first compressed data in which a plurality of programs are multiplexed in a time division manner;

extracting specific compressed audio/video data corresponding to a desired program from the first compressed data;

generating second compressed data including the compressed audio/video data extracted in the aforementioned step;

recording the second compressed data in recording means;

reading the second compressed data from the recording means, decoding the compressed data by a reproducing means, and subsequently reproducing the encoded data; and controlling the transmitting and reading of the second compressed data to and from the recording means in a time division manner.

In the apparatus for recording and reproducing digital data according to the present invention, MPEG2-PES data is generated by the record control means, so that there is no need to transmit the MPEG2-PES data to the data separating means. In addition, since the recording means, or the hard disk, can be controlled in a time division manner, a simultaneous recording and reproducing can be performed by controlling the record control means and the reproduction control means in a time division manner by the time division control means. In other words, while a conventional apparatus such as a VCR, for recording and reproducing digital data cannot reproduce digital data until the entire program is recorded, the apparatus of the present invention can reproduce a digital broadcast program at the same time it is recorded.

Further, in the method of recording and reproducing digital data according to the present invention, the received MPEG2-TS data is not recorded by the recording means just as it is, but MPEG2-PES data is generated from the MPEG2-TS data and then recorded by the recording means. For this reason, there is no need to extract necessary compressed audio/video data by the data separating means.

DESCRIPTION OF THE PREFERRED EMBODIMENTS

An embodiment of an apparatus and method for recording and reproducing digital data according to the present invention will be described with reference to the accompanying drawings.

Figure 1:
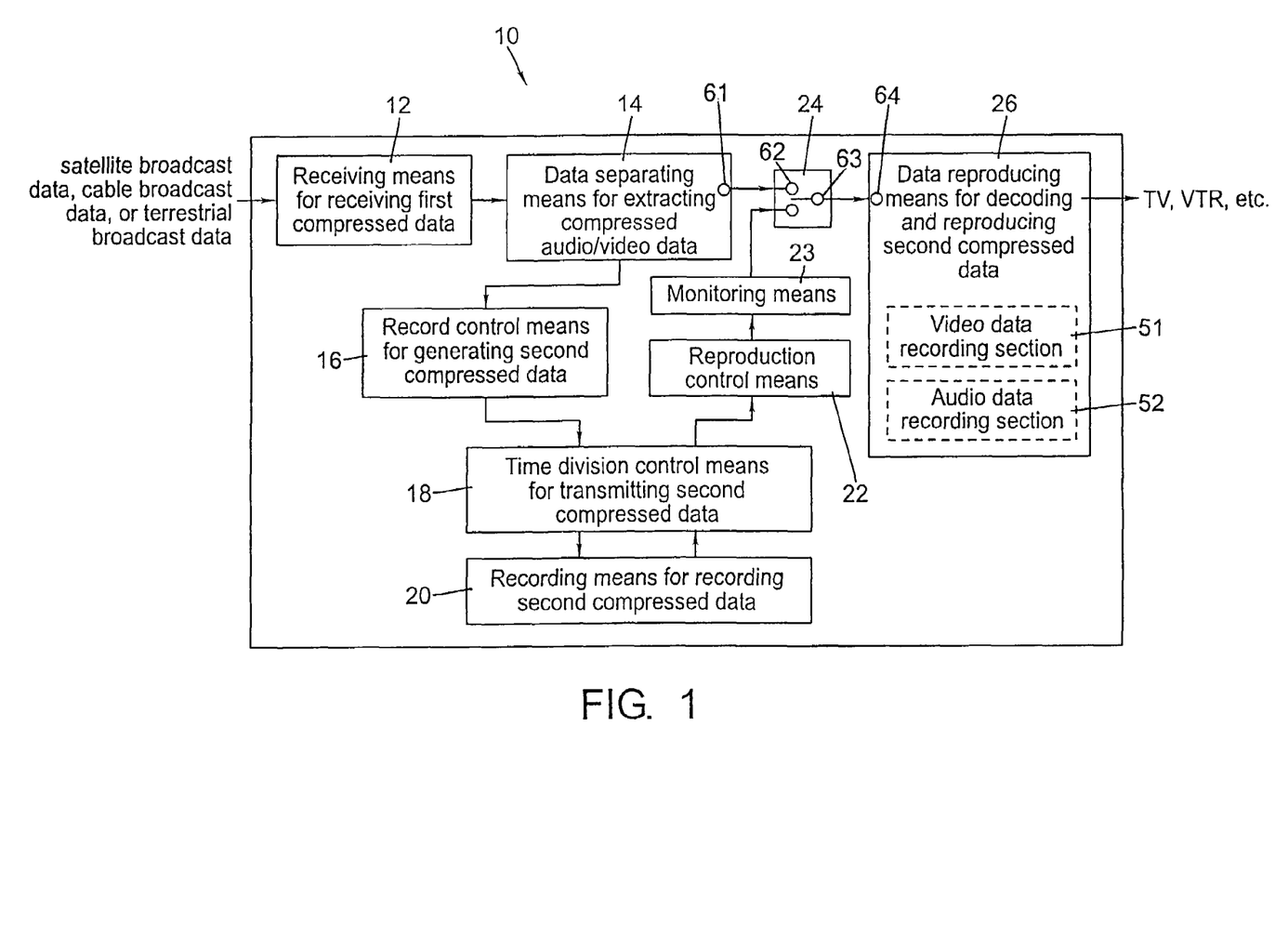
FIG. 1 is a block diagram of an apparatus for recording and reproducing digital data according to the present invention, showing a process of recording received digital data.

As shown in FIG. 1, an apparatus 10 for recording and reproducing digital data according to the present invention, comprises:

receiving means 12 for receiving first compressed data composed of a plurality of packets, in which a plurality of programs are multiplexed in a time division manner;

data separating means 14 for extracting specific compressed audio/video data corresponding to a desired program from the first compressed data received by the receiving means 12;

record control means 16 for generating second compressed data including the compressed audio/video data extracted by the data separating means 14;

recording means 20 for recording the second compressed data generated by the record control means 16;

data reproducing means 26 for decoding the compressed audio/video data included in the second compressed data; and time division control means 18 for controlling the transmitting and reading of the second compressed data to and from the recording means 20 in a time division manner.

Figure 2:
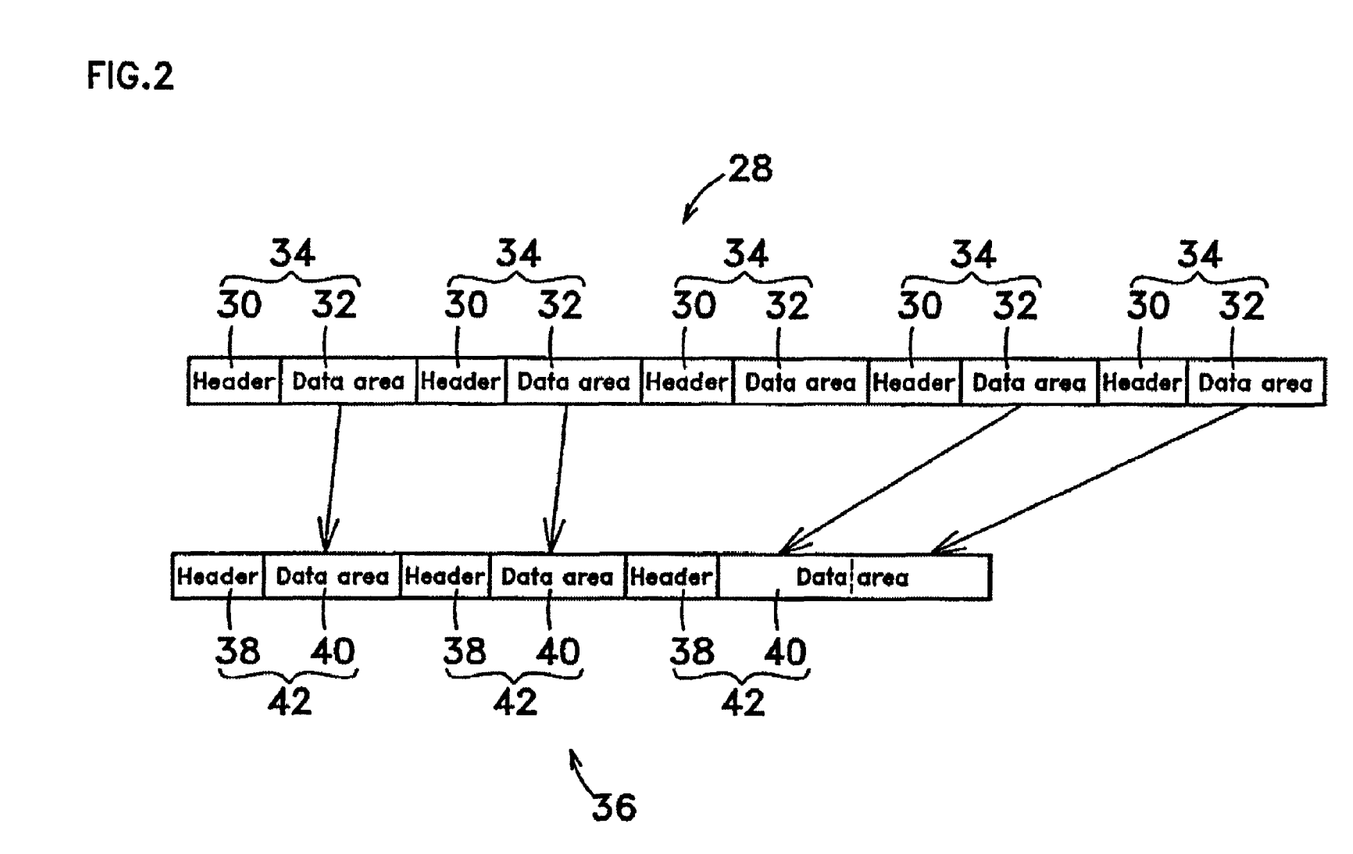
FIG. 2 shows how MPEG2-PES data and recording data are extracted from MPEG2-TS data.

The first compressed data received by the receiving means 12 is MPEG2-TS data 28 composed of a plurality of TS packets 34 as shown in FIG. 2. A data area 32 of each TS packet 34 is composed of compressed audio/video data. The compressed video/audio data for a specific program extracted by the data separating means 14 is sent to the record control means 16 to generate the second compressed data. The second compressed data generated by the record control means 16 is MPEG2-PES data 42, and a data area 40 is composed of at least one compressed audio/video data included in the data area 32.

A hard disc or the like is used as the recording means 20 for recording the MPEG2-PES data 42. As shown in FIG. 1, the apparatus 10 further includes a selecting or switching means 24 for selectively transmitting the compressed audio/video data extracted by the data separating means 14 to the data reproducing means 26. When the MPEG2-PES data 42 recorded in the recording means 20 is read and transmitted to the data reproducing means 26, the selecting or switching means 24 is controlled to connect the reproduction control means 22 to the data reproducing means 26. An output 61 of the data separating means 14 is directly connected to an input 62 of the selecting or switching means 24. An output 63 of the selecting or switching means 24 is directly connected to an input 64 of the data reproducing means 26. The data reproducing means 26 has a video data decoding section 51 and an audio data decoding section 52 for decoding the compressed audio data and the compressed video data, respectively. The means 26 also has a buffer for temporarily holding data. In order to prevent an overflow or underflow in the buffer, the apparatus 10 may further comprise monitoring means 23 monitoring the amount of data transmitted from the reproduction control means 22 to the data reproducing means 26.

In the method for recording digital data, the receiving means 12 receives digital broadcast programs transmitted from an MPEG2 system which transmits digital data such as satellite broadcast data, cable broadcast data, and terrestrial broadcast data. The received digital broadcast data is composed of a plurality of TS packets 34, as shown in FIG. 2. Since the received digital broadcast data is MPEG2-TS data 28 in which a plurality of programs are multiplexed, the data separating means 14 extracts specific compressed audio/video data corresponding to a desired program from the data areas 32 of the TS packets 34. The record controlling means 16 is responsive to the extracted data to generate the MPEG2-PES data 42 including a data area 40 which is composed of the compressed audio/video data. The MPEG2-PES data 42 is recorded in the recording means 20. When the MPEG2-PES data is recorded, the selecting means 24 is controlled to disconnect the data separating means 14 and the reproduction control means 22 from the data reproducing means 26. The time division control means 18 is then controlled to gate the output from the record control means 16 to the recording means 20.

The MPEG2-PES data 42 is recorded in the recording means 20 in such a manner that the time relation between the data areas in the MPEG2-PES data 28 are not disturbed, as shown in FIG. 2. Specifically, the respective MPEG2-PES data 42 are generated and recorded by the recording means 12 in the order in which they are received by the receiving means 12. The header 38 contains data for distinguishing the compressed video data and the compressed audio data, and the compressed audio and video data can be thereby synchronized when the MPEG2-PES data 42 recorded in the recording means 20 are reproduced. By recording the MPEG2-PES data 42 as one stream of data (recording data 36), the recording means 20, which has a function of sequential reading, can be operated at a high-speed bit rate.

As described above, digital data is recorded by the recording means 20 by way of the receiving means 12, the data separating means 14, and the record control means 16.

Figure 3:
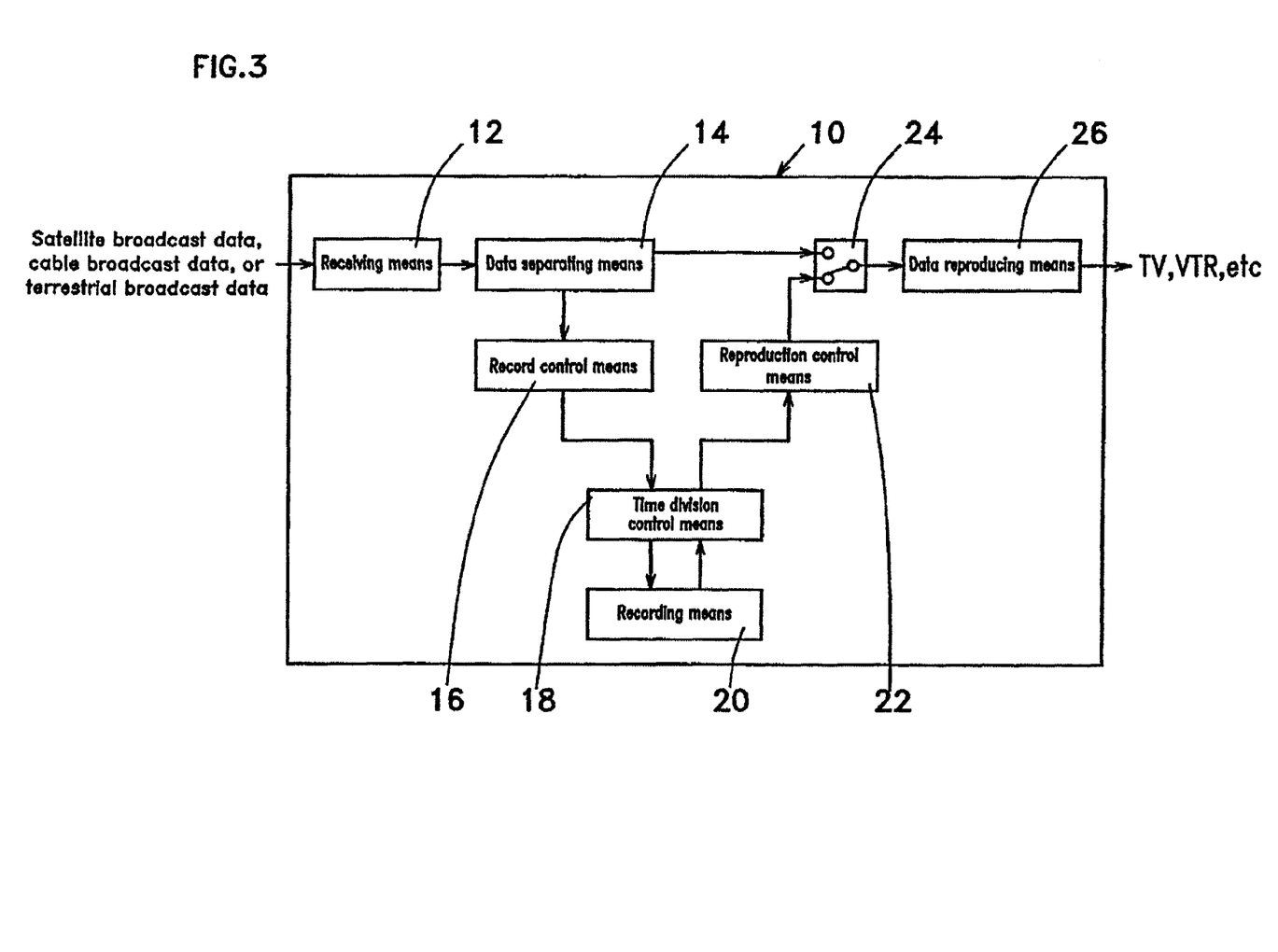
FIG. 3 is a block diagram of an apparatus for recording and reproducing digital data according to the present invention, showing a process of reproducing data recorded in a recording means or recording and reproducing data at the same time.

When reproducing the digital data in the recording means 20, the selecting means 24 is controlled to connect the reproduction control means 22 to the data reproducing means 26, as shown in FIG. 3. The time division control means 20 is controlled to connect the recording means 20 to the reproduction control means 22. The reproduction control means 22 reads the MPEG2-PES data 42 recorded in the recording means 20, and transmits the data 42 to the data reproducing means 26. The data 42 is read in the order in which it was recorded by recording means 20. In this case, data 42 is transmitted to an audio data encoder or a video data encoder with reference to the header 38 which distinguishes the compressed video data and the compressed audio data. In addition, monitoring means monitors the amount of data so that an overflow or underflow does not occur in the buffer of the data reproducing means 26. The audio data decoding section and the video data decoding section decode the compressed audio data and the compressed video data, respectively, and then displaying means such as a TV, reproduces the decoded data. The digital data recorded in the recording means 20 is reproduced by way of the reproduction control means 22 and the data reproducing means 26.

The simultaneous recording and reproducing of digital data can be performed by controlling the time division control means 18 in a time division manner while the reproduction control means 22 is kept connected to the data reproduction means 26 by the selecting means 24. The transmitting and reading of the MPEG2-PES data 42 to and from the recording means 20 are performed in a time division manner. Since the MPEG2-PES data 42 is transmitted to and read from the recording means 20 at a high speed, the viewer can use the apparatus 10 for recording and reproducing digital data at the same time.

Where a program on the air is reproduced, the selecting means 24 connects the data separating means 14 to the data reproducing means 26, and thereby the compressed audio/video data extracted by the selecting means 14 are transmitted to the data reproducing means 26 in succession. The data reproducing means 26 decodes the compressed audio/video data in the order in which the means 26 received them, and then the decoded data are reproduced on the television screen.

In the apparatus 10 for recording and reproducing digital data according to the present invention, since the transmitting and reading of the MPEG2-PES data 42 to and from the recording means 20 respectfully, occurs in a time division manner, the viewer can use the apparatus 10 for recording and reproducing digital data at the same time. For this reason, the viewer can watch a digital broadcast program at the same time it is being recorded. The viewer can alternatively watch a delayed version of the program being recorded or watch a different program previously recorded while at the same time recording a digital broadcast program. In other words, while a conventional apparatus 46 cannot reproduce digital data until the entire program is recorded, the apparatus of the present invention can reproduce a digital broadcast program at the same time it is being recorded.

Figure 4:
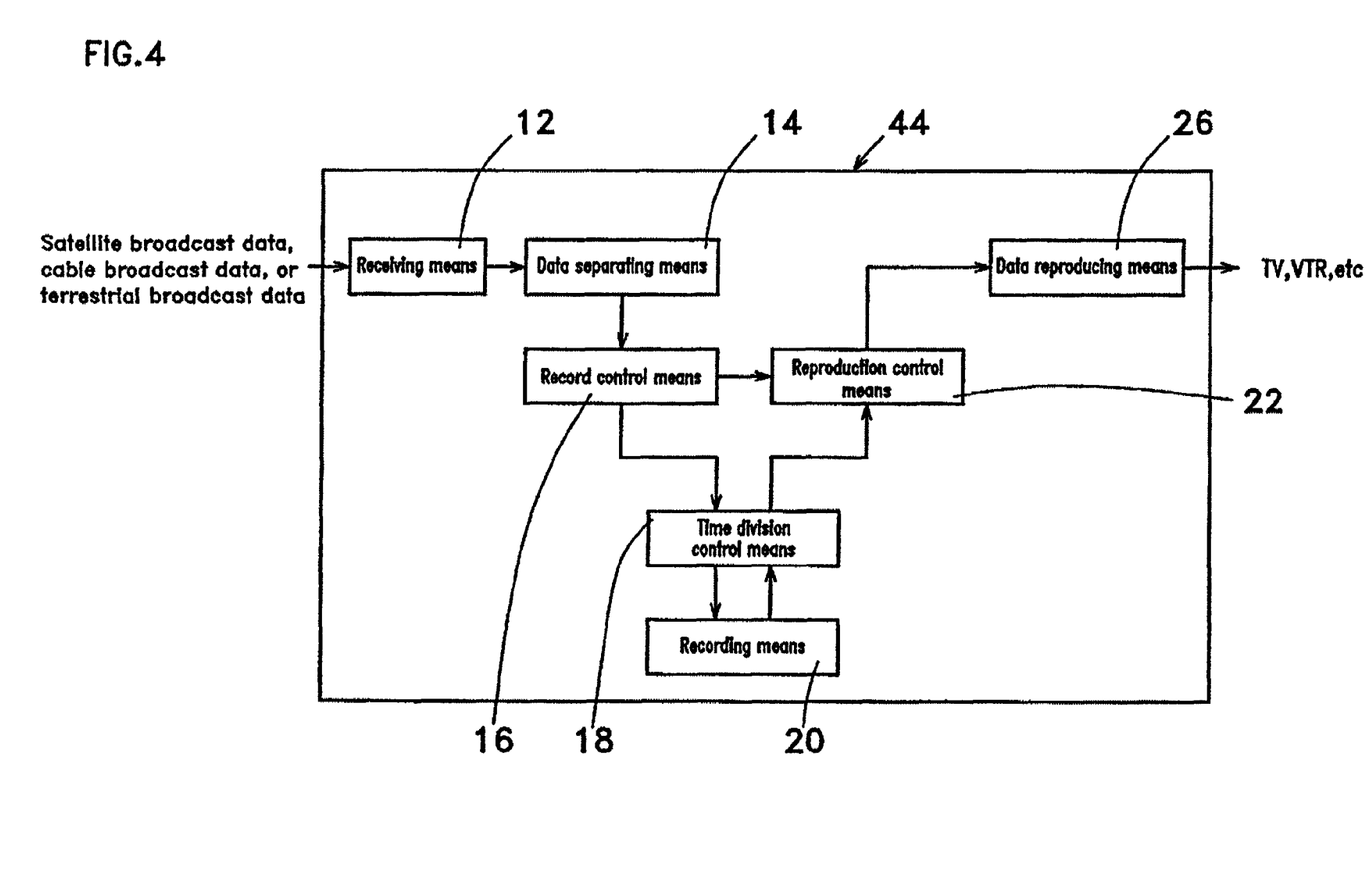
FIG. 4 is a block diagram of another embodiment of the apparatus for recording and reproducing digital data according to the present invention.

One embodiment of the apparatus and method for recording and reproducing digital data according to the present invention has thus been described, however, the present invention is not limited to the above embodiment. In another embodiment, the apparatus of the present invention does not necessarily require the selecting means, as shown in FIG. 4. Since there is no selecting means in this apparatus, all the compressed video data and audio data that are extracted from the MPEG2-TS data 28 by the data selecting means 14 are transmitted to the record control means 16. If the extracted data is recorded after generating MPEG2-PES data 42 therefrom, it is transmitted to the recording means 20. Alternatively, if the extracted data is to be reproduced at once, it is transmitted to the reproduction control means 22. In this case, the reproduction control means 22 transmits the data 42 to the data reproducing means 26, and then the means 26 decodes the data 42, and finally the data is reproduced on a television screen.

When the MPEG2-PES data 42 recorded by the recording means 20 is reproduced, the reproduction control means 22 transmits the data 42 to the data reproducing means 26, and then the means 26 decodes the data 42, and finally the data is reproduced on a television screen. As in the case of the above embodiment, the simultaneous recording and reproducing can be performed by controlling the record control means 16 and the reproduction control means 22 in a time division manner by the time division control means 18.

Figure 5:
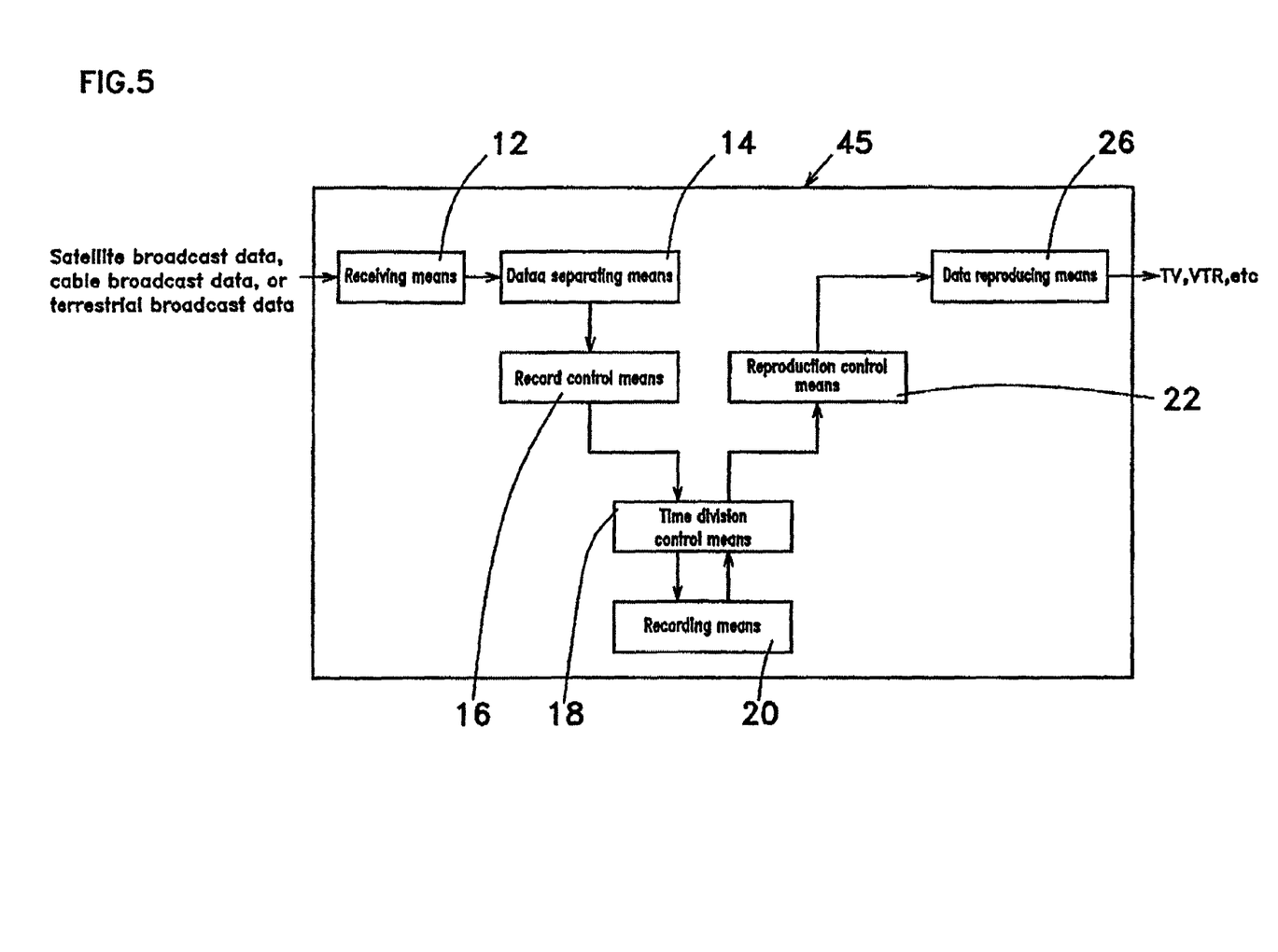
FIG. 5 is a block diagram of still another embodiment of the apparatus for recording and reproducing digital data according to the present invention.

In still another embodiment, an apparatus 45 shown in FIG. 5 can be used for recording and reproducing digital data, as far as all the desired digital broadcast programs are recorded by the recording means 20 and immediately displayed on a display device. In the apparatus 45, the recorded data is immediately read by controlling the record control means 16 and the reproduction control means 22 in a time division manner by the time division control means 18, and then decoded by the data reproducing means 26, and finally reproduced on a television screen.

The recording means 20 is not necessarily built in to each of the apparatuses 10, 44, and 45, but it can be added externally to each apparatus. Further, instead of a hard disk used in the above embodiment, a high capacity memory module can be used as the recording means 20. The present invention is intended to embrace various modifications, alternations, improvements made on the basis of knowledge of those skilled in the art without departing from the scope of the invention.

What is claimed is:

1. An apparatus for recording and reproducing digital data, comprising:

receiving means for receiving first compressed data composed of a plurality of packets, said first compressed data including a plurality of programs multiplexed in a time division manner;

data separating means for extracting specific compressed audio/video data corresponding to a desired program from the first compressed data received by the receiving means;

record control means for generating second compressed data including the compressed audio/video data extracted by the data separating means;

recording means for recording the second compressed data generated by the record control means in a same order in which the first compressed data is received by the receiving means;

data reproducing means for decoding the compressed audio/video data included in the second compressed data simultaneous with additional second compressed data being recorded in the recording means;

reproduction control means for reading the second compressed data from the recording means and transmitting the second compressed data to the data reproducing means in a same order in which the second compressed data is recorded in the recording means;

time division control means for controlling the transmitting and reading of the second compressed data to and from the recording means in a time division manner and for controlling the record control means and the reproduction control means in a time division manner;

switching means for switching between transmitting the compressed audio/video data extracted by the data separating means to the data reproducing means and transmitting the second compressed data from the reproduction control means to the data reproducing means, said switching means being disposed between the data separating means and the data reproducing means, said switching means being disposed between the reproduction control means and the data reproducing means, wherein the time division control means is disposed between the record control means and the recording means with respect to the second compressed data being transmitted to the recording means such that the time division control means is directly connected to both the record control means and the recording means, wherein the time division control means is disposed between the recording means and the reproduction control means with respect to the second compressed data being transmitted from the recording means such that the time division control means is directly connected to both the recording means and the reproduction control means, wherein an output of the data separating means is directly connected to an input of the switching means, and wherein an output of the switching means is directly connected to an input of the data reproducing means.

2. The apparatus according to claim 1, wherein said first compressed data is MPEG2-TS data and said second compressed data is MPEG2-PES data.

3. The apparatus according to claim 1, further comprising monitoring means for monitoring the amount of data transmitted from the reproduction control means to the data reproducing means.

4. The apparatus according to claim 1, further comprising video data decoding section and audio data decoding section for decoding the compressed video data and compressed audio data, respectively, in the data reproducing means.

5. The apparatus according to claim 1, wherein said recording means is a hard disk.

6. A method for recording and reproducing digital data, comprising the steps of:

receiving first compressed data by receiving means, said first compressed data including a plurality of programs multiplexed in a time division manner;

extracting, by data separation means, specific compressed audio/video data corresponding to a desired program from the received first compressed data, said extracting being performed by data separating means;

generating, by record control means, second compressed data including the compressed audio/video data extracted in the extracting step;

recording the second compressed data in recording means in a same order in which the first compressed data is received in the receiving step by the receiving means;

reading, by reproduction control means, the second compressed data from the recording means, and subsequently transmitting the second compressed data to data reproducing means in a same order in which the second compressed data is recorded in the recording means;

decoding and reproducing the second compressed data by the data reproducing means simultaneous with additional second compressed data being recorded in the recording means;

controlling the transmitting and reading of the second compressed data to and from the recording means in a time division manner by time division control means;

controlling the record control means and the reproduction control means in a time division manner by the time division control means; and either transmitting, by a switching means, the compressed audio/video data extracted in the extracting step by the data separation means to the data reproducing means, while simultaneously blocking transmission of the second compressed data from the reproduction control means to the data reproducing means, said switching means being disposed between the data separating means and the data reproducing means; or transmitting, by the switching means, the second compressed data from the reproduction control means to the data reproducing means, while simultaneously blocking transmission of the compressed audio/video data extracted in the extracting step to the data reproducing means, said switching means being disposed between the reproduction control means and the data reproducing means, wherein the time division control means is disposed between the record control means and the recording means with respect to the second compressed data being transmitted to the recording means such that the time division control means is directly connected to both the record control means and the recording means, wherein the time division control means is disposed between the recording means and the reproduction control means with respect to the second compressed data being transmitted from the recording means such that the time division control means is directly connected to both the recording means and the reproduction control means, wherein an output of the data separating means is directly connected to an input of the switching means, and wherein an output of the switching means is directly connected to an input of the data reproducing means.

7. The method according to claim 6, wherein said first compressed data is MPEG2-TS data and said second compressed data is MPEG2-PES data.

8. The method according to claim 6, wherein said controlling is performed after said generating and before said recording, and wherein said controlling is performed after said reading and before said decoding.

9. The method according to claim 6, further comprising the step of:

transmitting the compressed audio/video data extracted in the extracting step to the data reproducing means, while simultaneously blocking transmission of the second compressed data from the reproduction control means to the data reproducing means; or transmitting the second compressed data from the reproduction control means to the data reproducing means, while simultaneously blocking transmission of the compressed audio/video data extracted in the extracting step to the data reproducing means.

10. The method according to claim 6, further comprising the step of monitoring the amount of said second compressed data decoded and reproduced by the data reproducing means.

11. An apparatus for recording and reproducing digital data, comprising:

a receiver for receiving first compressed data composed of MPEG2-TS data, said first compressed data including a plurality of programs multiplexed in a time division manner;

a filter for extracting specific compressed audio/video data corresponding to a desired program from the first compressed data received by the receiver;

a data unloader for generating second compressed data composed of MPEG2-PES data, including the compressed audio/video data extracted by the filter;

record control means for generating second compressed data including the compressed audio/video data extracted by the data separating means;

a recorder for recording the second compressed data generated by the data unloader in a same order in which the first compressed data is received by the receiver;

reproduction control means for reading the second compressed data from the recorder and transmitting the second compressed data to the decoder in a same order in which the second compressed data is recorded in the recorder;

a decoder for decoding the compressed audio/video data included in the second compressed data simultaneous with additional second compressed data being recorded in the recorder;

a time division controller for controlling the transmitting and reading of the second compressed data to and from the recorder in a time division manner and for controlling the data unloader and the reproduction control means in a time division manner;

switching means for switching between transmitting the compressed audio/video data extracted by the filter to the decoder and transmitting the second compressed data from the reproduction control means to the decoder, said switching means being disposed between the filter and the decoder, said switching means being disposed between the reproduction control means and the decoder, wherein the time division controller is disposed between the data unloader and the recorder with respect to the second compressed data being transmitted to the recorder such that the time division controller is directly connected to both the data unloader and the recorder, wherein the time division controller is disposed between the recorder and the reproduction control means with respect to the second compressed data being transmitted from the recorder such that the time division controller is directly connected to both the recorder and the reproduction control means, wherein an output of the filter is directly connected to an input of the switching means, and wherein an output of the switching means is directly connected to an input of the decoder.

12. The apparatus according to claim 11, further comprising monitoring means for monitoring the amount of data transmitted from the reproduction control means to the decoder.

13. The apparatus according to claim 11, wherein said recorder is a hard disk.

* * * * *